United States Patent [19]
Johnson

[11] Patent Number: 5,129,420

[45] Date of Patent: Jul. 14, 1992

[54] CUT-OFF VALVE

[75] Inventor: Charles N. Johnson, Racine, Wis.

[73] Assignee: Elwood Hydraulics Company, Inc., Oak Creek, Wis.

[21] Appl. No.: 747,607

[22] Filed: Aug. 20, 1991

[51] Int. Cl.⁵ .......................................... F16K 11/087
[52] U.S. Cl. .................................................. 137/595
[58] Field of Search ................ 137/595, 597, 864, 865

[56] References Cited

U.S. PATENT DOCUMENTS

| | | | |
|---|---|---|---|
| 1,600,008 | 9/1926 | Mock | 137/595 |
| 2,125,542 | 8/1938 | Catterlin | 137/595 X |
| 2,178,182 | 10/1939 | Mellinger | 137/865 |
| 3,698,428 | 10/1972 | Gastin | 137/595 |
| 3,704,989 | 12/1972 | Decot et al. | 137/595 |
| 3,746,048 | 7/1973 | Harper | 137/607 X |
| 3,894,559 | 7/1975 | DePuy | 137/595 |
| 4,817,374 | 4/1989 | Kitta | 137/595 |
| 4,880,032 | 11/1989 | Doutt | 137/625.19 |

Primary Examiner—Stephen M. Hepperle
Attorney, Agent, or Firm—Arthur J. Hansmann

[57] ABSTRACT

A cut-off valve with multiple passageways and a single-handle control sandwiched between a manifold and a control member.

13 Claims, 3 Drawing Sheets

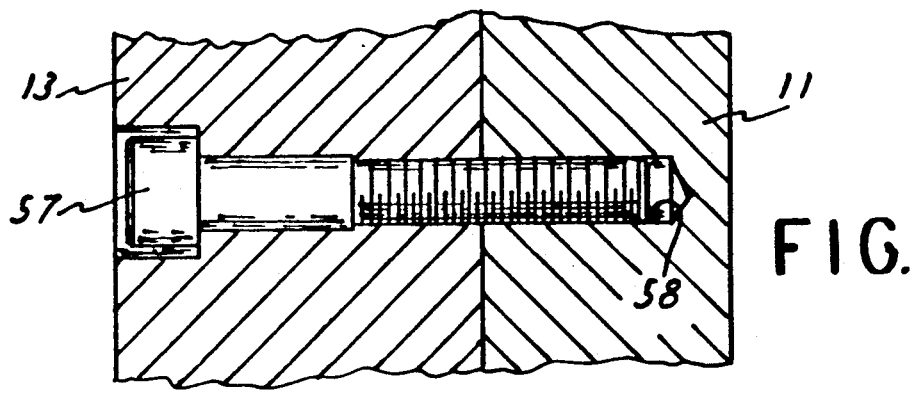
FIG. 6
FIG. 5
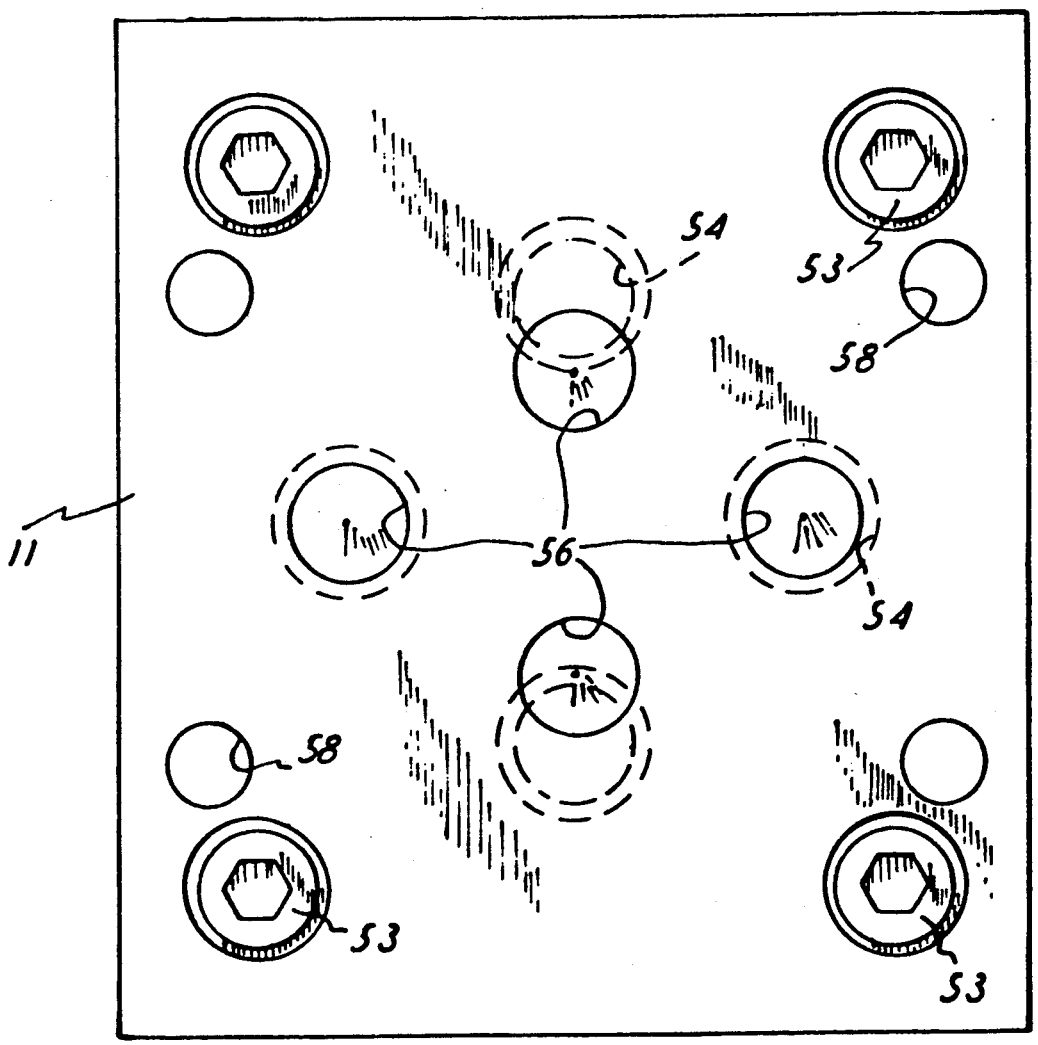

CUT-OFF VALVE

This invention relates to a cut-off valve and, more particularly, it relates to a valve for controlling the flow of fluid between a supply source and a downstream destination for the fluid.

BACKGROUND OF THE INVENTION

The valve of this invention is a multi-passageway type of valve, and it has a single control handle for actuating the valve closures in unison. That is, all of the passageways can be shut off or in the open position, but they are all in the same closed or open mode and are all controlled through the single handle.

Single handle and multiple passageway valves are already known in the art, and examples of such are seen in U.S. Pat. Nos. 3,409,048 and 3,698,428 and 3,746,048 and 4,533,113 and 4,880,032 and 4,964,434. The aforementioned are all U.S. patents, and, U.S. Pat. No. 3,698,428 also shows closures in axial alignment, but with separate operating arms for each closure; and U.S. Pat. No. 4,880,032 shows a single closure with two passageways spaced apart therein. Beyond the aforementioned, the prior art patents do not disclose a cut-off valve wherein there are multiple passageways in parallel orientation and with the operating valve stems or the like all being parallel and with two of the closures or two of the passageways being in tandem arrangement. With that arrangement, a single handle can operate four closures in four separate passageways.

Still further, all of the multi-passageways of this invention are arranged in parallel relationship and are in a body which is adapted to receive a manifold, on the upstream of the passageways for the inlet of fluid into the body, and to receive a member, on the downstream side of the passageways in the body, to thereby isolate the aforesaid downstream valve from the supply or inlet manifold so that the downstream valve can be moved for replacement, repair, or the like without the leakage of fluid from the system.

The present invention also provides a multi-passageway valve wherein there are closures in each of the passageways, and there is a control attached to the closures and the arrangement is such that all of the closures are set in identical positions of being open, partly open, or closed. Still further, the apparatus of this invention has a lock, indicator, or the like, which secures and indicates the position of the closures in any degree of open or closed positions. With that arrangement, for instance, the operator can set the closures in the fully closed position, and can lock them in that position, and thereby be assured that the fluid is cut off from the downstream member which can then be removed for repair, replacement, or the like.

In this system, there can be a plurality of sections or lines for fluid flow, with each section or line incorporating the multi-passageway cut-off valve of this invention and the upstream manifold and the downstream member, and only that one line, of all the fluid lines in the system, can be shut down for purposes of replacement, repair, or the like, without the need for shutting down all of the lines in the entire multi-line system.

BRIEF DESCRIPTION OF THE DRAWINGS

FIG. 5 is a side elevational view and with the view being taken along the line 5—5 of FIG. 1.

FIG. 6 is a section view taken along the line 6—6 of FIG. 1.

DETAILED DESCRIPTION OF THE PREFERRED EMBODIMENT

Figure 2:
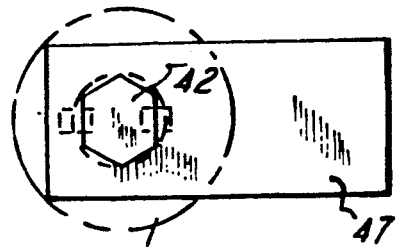
FIG. 2 is a top plan view of a fragment of FIG. 1.
Figure 1:
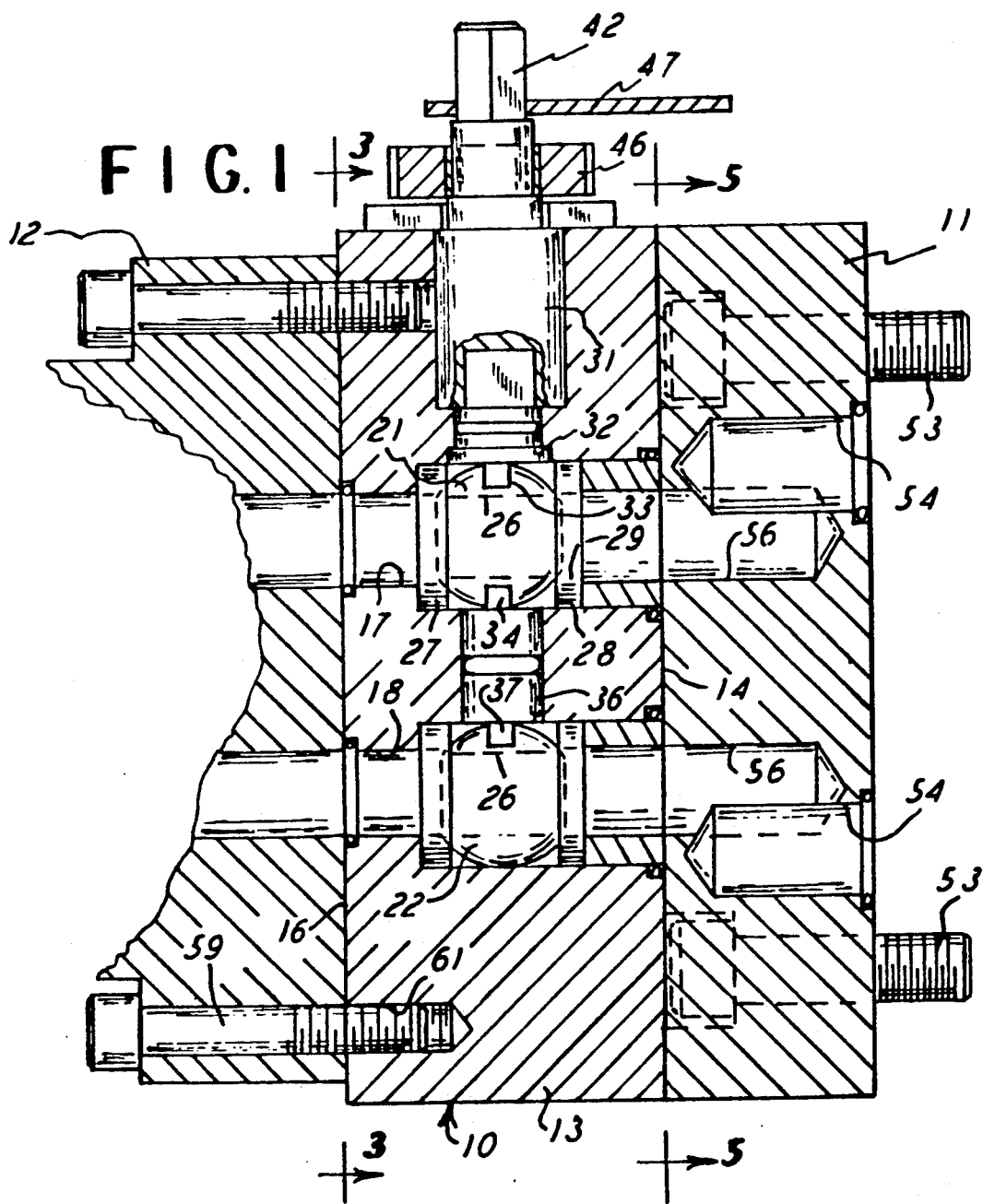
FIG. 1 is a section view taken through a preferred embodiment of this invention, and with the section being taken on the line 1—1 of FIG. 3.

The invention is shown, and is disclosed herein, as it relates to a cut-off valve which intercedes between an upstream supply or manifold for the flow of fluid and a downstream apparatus or valve of a multi-passageway type. That is, FIG. 1 shows the cut-off valve 10 sandwiched between a manifold or like member 11 and a multi-passageway member 12. These three sections 10, 11, and 12 all present multi-passageways, four in number in this disclosure, which are in flow communication with each other and throughout the assembly of the three sections 10, 11, and 12.

The cut-off valve 10 is unique in that it has a valve body 13 which has an upstream flat side or face 14 and a downstream flat side or face 16, with the faces 14 and 16 being on one plane, as displayed in FIG. 1. Four fluid passageways 17, 18, 19, and 20, extend completely through the body 13 from the face 14 and to the face 16, and the passageways are parallel to each other on respective axes perpendicular to the faces 14 and 16 which are also parallel to each other.

Each of the passageways 17-20 has a respective spherical-type fluid closure 21, 22, 23, and 24, movably disclosed therein. Each closure has its own fluid passageway 26 which extends therethrough and which aligns with the respective fluid passageway 17-20 in the body 13 when the closures 21-24 are in the rotated positions shown in the drawings. Sealing or guide rings 27 and 28, which are circular in shape and have their own passageways 29 extending therethrough, flank each closure 21-24, and the rings 27 and 28 thus serve as seats for the closures, all in a conventional arrangement. Of course when the closures 21-24 are rotated to positions ninety degrees from the positions shown in the drawings, then the closures 21-24 are in the fluid-closed positions, and no flow will go through the closures and therefore no flow through the passageways 17-20.

To rotate the closures 21 and 22, a cylindrical stem 31 extends into the body 13 and has a connector 32 engaged with the closure 21 through the key 33. Also, a key 34 is between the closure 21 and a cylindrical piece 36 which is described as a complimentary piece relative to the stem 31 and is therefore itself a valve stem. The stem 36 and the valve 22 have an inter-connecting key 37 in between for rotational control of the valve 22, just as with the valve 21 and key 33. Therefore, rotation of the stem 31 will in turn and likewise rotate the closure 21 which in turn will rotate the stem 36 which in turn will rotate the closure 22, all the rotation being in unison. It is therefore described herein that the closures 21 and 22, and their respective passageways 17 and 18, are in tandem position, that is they are on the same plane which is on the line designated 1—1 in FIG. 3.

Figure 3:
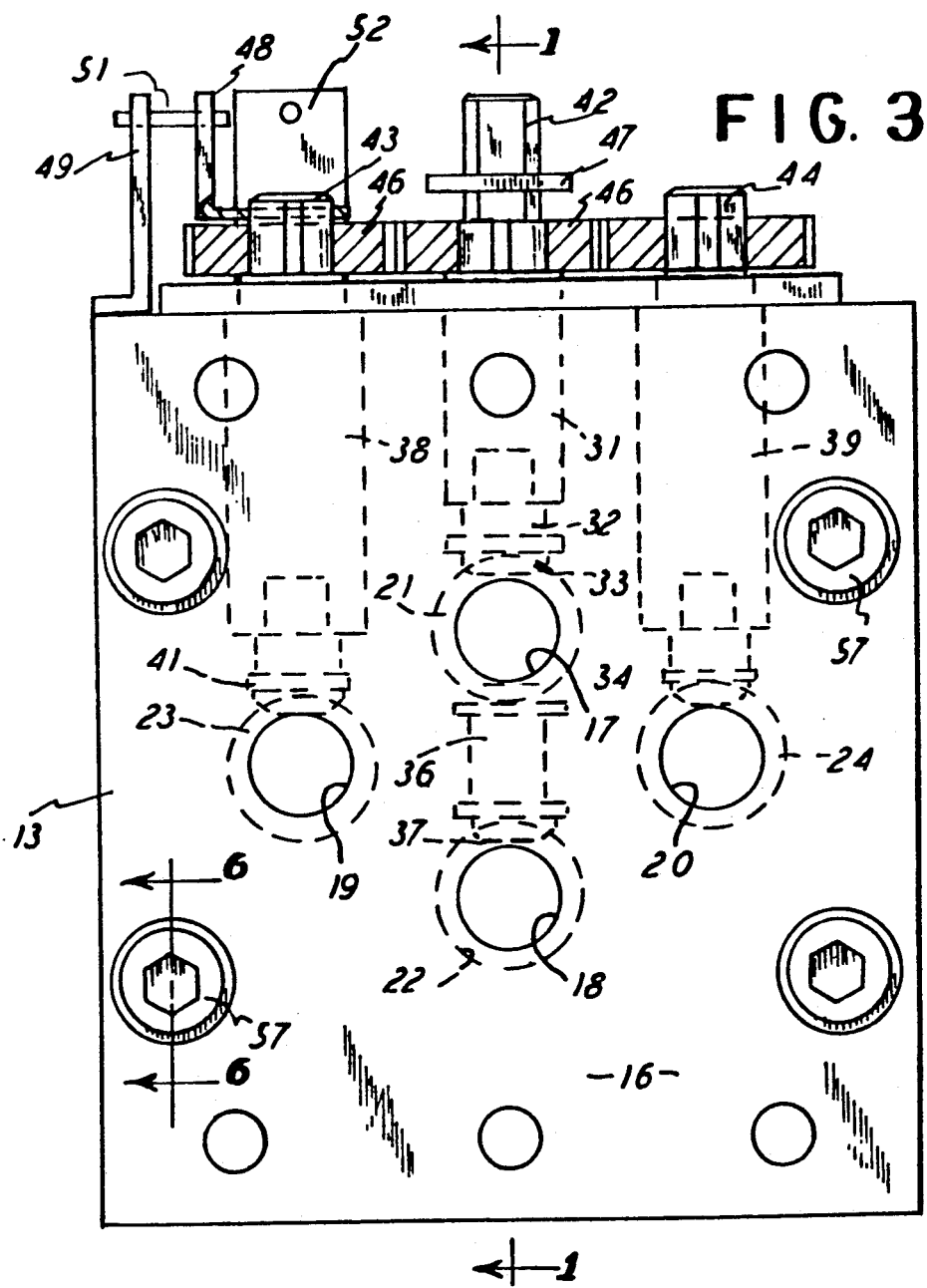
FIG. 3 is a side elevational view, and with the view being taken along the line 3—3 of FIG. 1.

Passageways 19 and 20 are on opposite sides of the plane of the passageways 17 and 18, as shown in FIG. 3, and their respective closures 23 and 24 are also arranged like the closures 21 and 22. Thus, valve stems 38 and 39 extend through the body 10 and interconnect with the respective closures 23 and 24, by means of the keyed connectors 41, again as with the keyed connectors 33, 34, and 37 shown in FIG. 1.

The three valve stems 31, 38, and 39 extend outwardly from the body 13 and into extending ends 42, 43, and 44, respectively. Each of these three extending stem ends has a gear 46 affixed thereto, and the three gears 46 are in mesh with each other. The central stem 42 has a handle 47 affixed thereto. Accordingly, rotation of the stem 42 by means of the handle 47 will rotate the gear 46 on the stem 42 and will also rotate the gears 46 on the stems 43 and 44. Accordingly, the four closures 21-24 will all rotate in unison and to the same open, partly open, or closed positions.

Figure 4:
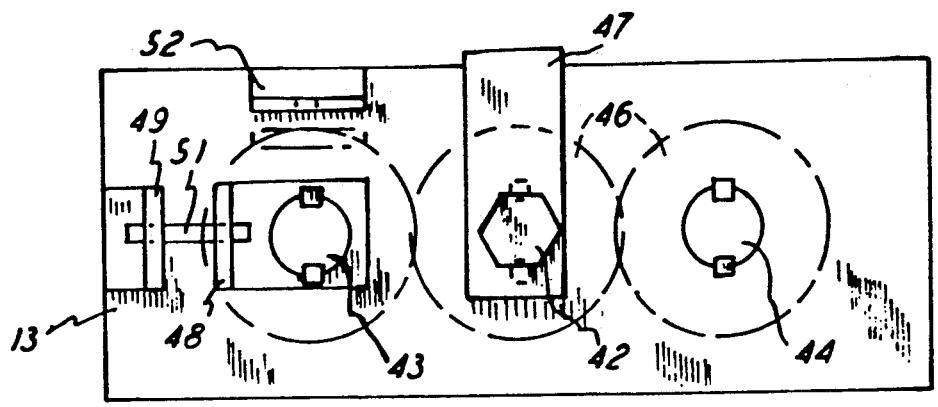
FIG. 4 is a top plan view of FIG. 3.

A lock arrangement is provided for the several stems, and thus an arm 48 is affixed to the stem 43 and a bracket 49 is adjacent the arm 48 such that a lock or key 51 can extend between the arm 48 and the bracket 49 for securing the stems 42, 43, and 44 in the one locked position, such as the open position shown in FIGS. 1 and 3. Also, when the control 47 is rotated ninety degrees counter-clockwise, as viewed in FIG. 4, then the arm 48 will rotate clockwise and align with another bracket 52 where the lock 51 can be applied between the arm 48 and the aligned bracket 52 for purposes of locking the four closures in the fluid-flow closed position. In that way, the operator will always know when the closures are in the open or closed positions, and will be able to secure them in either position, by means of the key or lock 51 which is of course removable and positionable relative to the arm 48 and the respective bracket 49 and 52.

As previously disclosed, the assembly is in a sandwich-type arrangement with the three portions 10, 11, and 12. FIG. 1 shows a plurality of screws 53 extending through the portion or manifold 11 which can therefore be connected to an unshown piece which is providing a fluid-flow supply to the four passageways of the manifold 11, such as the shown two passageways 54 thereof, and those four passageways 54 are in flow communication with passageways 56 which are four in number and which are in axial alignment with the respective four passageways 17-20 of the cut-off valve body 10.

Next, FIGS. 3, 5, and 6 show that the body 13 is connected with the manifold 11 through the attaching screws 57 which extend through the body 13 and into threaded openings 58 in the manifold 11, for instance.

Finally, connecting screws 59 extend through the control valve 12 and into threaded openings 61 in the cut-off valve body 13 and thereby connect the valve 12 with the body 13.

As previously mentioned, the four passageways are therefore in fluid-flow communication from the manifold 11 and into the member 12, and they are controlled by means of the respective closures 21-24. Suitable O-rings are provided between the several pieces, as shown in FIG. 1, for instance, so that the system if fluid tight.

With this arrangement, when it is desired to cut off the flow to the control member 12, such as for purposes of repairing that branch of the entire system, for instance, then the cut-off valve 10 can be placed into the closed position so that there is no flow through the four passageways 17-20. The operator will know that the cut-off valve 10 is in the closed position, because he will know the position of the arm 48 relative to the bracket 52 and he can hold the arm 48 in the locked position by means of the lock key or the like 51. With the cut-off valve 10 in the closed position, then the member 12 can be taken out of the assembly for repair, replacement, or interchange or the like. Therefore, there need not be a shut-down of the complete system which would have other branches in the system, in addition to the branch with the four passageways described herein, if that be the arrangement. Or, if there is only the single branch as described herein, then even in that event the system can be shut down through the use of the cut-off valve 10 for the alteration purposes mentioned herein. In this description, the single handle control and the three gears and respective stems described herein are all part of a rotator means which is in operable connection relative to the closures described herein. Further, the respective three stems described are disposed perpendicular to the axes of the four passageways described herein. Of course the portions of the passageways 17-20 adjacent the manifold 11 present an inlet end, and the four passageways 17-20 adjacent the cut-off member 12 present an outlet end relative to the four passageways.

What is claimed is:

1. A cut-off valve having a plurality of passageways, comprising a body having several parallel passageways extending therethrough, two of said passageways extending along a plane extending through said body and an additional passageway being disposed in said body to each opposite side of said plane, a valve closure disposed in each of said passageways and being movable therein for completely sealing against flow through said passageways, two of said closures being on said plane and another two of said closures being disposed to each opposite side of said plane and with all said closures being operatively movable on axes parallel to said plane for opening and fully closing relative to fluid passing through said passageways, three valve closure stems rotatable in said body and connected with said closures and having and extending in respective extending ends from each of said closures and through the exterior of said body at only one side of said body to thereby have each respective one of said stems extend through said body in only one respective location on said body and with each of said stems being parallel to said plane, and with one of said stems extending along said plane and being operatively connected with said two of said closures which are on said plane, and valve stem rotator means located only on said one side of said body and being interconnected with all said stems only on said one side of said body for rotating said stems in unison and thereby open and close said closures in unison.

2. The cut-off valve having a plurality of passageways, as claimed in claim 1, wherein said two closures on said plane have their said axis on a common straight line to thereby be disposed in tandem relationship to each other.

3. The cut-off valve having a plurality of passageways, as claimed in claim 2, wherein said additional passageways are disposed along a plane which extends through said body perpendicular to the first-mentioned said plane.

4. The cut-off valve having a plurality of passageways, as claimed in claim 1, including a lock operably associated with said rotator means for releasably selectably securing said rotator means in respective closure opened and closure closed positions.

5. The cut-off valve having a plurality of passageways, as claimed in claim 1, wherein each of said passageways includes a fluid inlet opening and a fluid outlet opening at respective opposite ends of said passageways and at respective opposite sides of said body, and including a multi-port member having a plurality of fluid passageways and being attached to said body at said side thereof which includes said fluid outlet openings and with said passageways of said body and said multi-port member being in fluid-flow communication, and a fluid-flow manifold attached to said body at said side thereof which includes said fluid inlet openings and with said body and said manifold being in fluid-flow communication.

6. The cut-off valve having a plurality of passageways, as claimed in claim 5, including a lock operably associated with said rotator means for releasably selectably securing said rotator means in respective closure opened and closure closed positions.

7. The cut-off valve having a plurality of passageways, as claimed in claim 5, wherein said two closures on said plane have their said axis on a common straight line to thereby be disposed in tandem relationship to each other.

8. The cut-off valve having a plurality of passageways, as claimed in claim 7, wherein said additional passageways are disposed along a plane which extends through said body perpendicular to the first-mentioned said plane.

9. The cut-off valve having a plurality of passageways, as claimed in claim 1, including a multi-port member and a manifold member, and with said body being disposed and releasably connected intermediate said multi-port member and said manifold member in a three-part assembly, and with said multi-port member and said manifold member having fluid-flow passageways in respective fluid-flow communication with all said passageways of said body.

10. The cut-off valve having a plurality of passageways, as claimed in claim 9, including a lock operably associated with said rotator means for releasably selectably securing said rotator means in respective closure opened and closure closed positions.

11. A cut-off valve comprising a body having several parallel passageways extending therethrough, a valve closure disposed in each of said passageways and with all said closures being operatively movable on parallel axes about which all said closures are operatively movable for opening and sealing-closing relative to fluid passing through said passageways, a valve closure stem respectively extending along each of said axes and being rotatable in said body and respectively connected with and extending from each of said closures and through the exterior of said body at only one side of said body, valve stem rotator means located only on said one side of said body and being interconnected with all said stems only on said one side of said body for rotating said stems in unison and thereby open and close said closures in unison, said body having opposite faces thereon, each of said passageways having a fluid inlet opening and fluid outlet opening at respective opposite ends of said passageways and at respective said opposite faces of said body, a multi-port member having a plurality of fluid passageways and being attached to said body at said face thereof which includes said fluid outlet openings and with said passageways of said body and said multiport member being in fluid-flow communication, and a fluid-flow manifold attached to said body at said face thereof which includes said fluid inlet openings and with said body and said manifold being in fluid-flow communication, and a lock operably associated with said rotator means for releasably selectably securing said rotator means in respective closure opened and closure closed positions.

12. A cut-off valve having a plurality of passageways, comprising a body having several parallel passageways extending therethrough, two of said passageways extending along a first plane extending through said body and an additional passageway being disposed in said body to each opposite side of said first plane along a second plane which extends through said body perpendicular to said first plane, a valve closure disposed in each of said passageways and with two of said closures being on said first plane and another two of said closures being disposed to each opposite side of said first plane and with all said closures being operatively movable on axes parallel to said first plane for opening and closing relative to fluid passing through said passageways, said two closures on said first plane having their said axis on a common straight line to thereby be disposed in tandem relationship to each other, valve closure stems rotatable in said body and connected with and extending from each of said closures to the exterior of said body and being parallel to said first plane, and with one of said stems extending along said first plane and operatively connected with said two of said closures which are on said first plane, and valve stem rotator means interconnected with all said stems for rotating said stems in unison and thereby open and close said closures in unison.

13. The cut off valve having a plurality of passageways, as claimed in claim 12, including a lock operably associated with said rotator means for releasably selectably securing said rotator means in respective closure opened and closure closed positions.

* * * * *